(12) United States Patent
Ochi et al.

(10) Patent No.: US 12,401,876 B2
(45) Date of Patent: Aug. 26, 2025

(54) IMAGING DEVICE

(71) Applicant: HITACHI HIGH-TECH CORPORATION, Tokyo (JP)

(72) Inventors: Manabu Ochi, Tokyo (JP); Yosuke Horie, Tokyo (JP); Takashi Saegusa, Tokyo (JP); Tetsuji Kawahara, Tokyo (JP); Yoichiro Suzuki, Tokyo (JP); Kenshiro Sakata, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 66 days.

(21) Appl. No.: 18/560,723

(22) PCT Filed: May 2, 2022

(86) PCT No.: PCT/JP2022/019476
§ 371 (c)(1),
(2) Date: Nov. 14, 2023

(87) PCT Pub. No.: WO2022/264704
PCT Pub. Date: Dec. 22, 2022

(65) Prior Publication Data
US 2024/0284027 A1      Aug. 22, 2024

(30) Foreign Application Priority Data

Jun. 16, 2021 (JP) ................. 2021-100184

(51) Int. Cl.
*H04N 23/55* (2023.01)
*B01L 3/02* (2006.01)
(Continued)

(52) U.S. Cl.
CPC ........... *H04N 23/55* (2023.01); *B01L 3/0213* (2013.01); *G03B 17/17* (2013.01); *H04N 23/531* (2023.01)

(58) Field of Classification Search
CPC .... H04N 23/55; H04N 23/531; B01L 3/0213; B01L 3/02; G03B 17/17; G01N 2035/103; G01N 35/1011
See application file for complete search history.

(56) References Cited

U.S. PATENT DOCUMENTS

| 6,359,694 B1 | 3/2002 | Stredele et al. |
| 6,435,808 B1 | 8/2002 | Araya et al. |
| (Continued) | | |

FOREIGN PATENT DOCUMENTS

| JP | 2872765 B2 | 3/1999 |
| JP | 2005-049197 A | 2/2005 |
| (Continued) | | |

OTHER PUBLICATIONS

International Search Report with English Translation and Written Opinion of International Patent Application No. PCT/JP2022/019476 dated Jun. 14, 2022 (9 pages).

(Continued)

*Primary Examiner* — Padma Haliyur
(74) *Attorney, Agent, or Firm* — Foley & Lardner LLP

(57) ABSTRACT

Provided is a technique for detecting deviation amounts in two directions between a tip of a nozzle of a pipetting device and a target stop position from one image. An imaging device of the present disclosure is an imaging device installed in a pipetting device including a nozzle that aspirates and dispenses liquid and an arm that holds the nozzle and moves the nozzle by a rotation operation. The imaging device includes: a camera that includes an image sensor and a lens; and a pair of mirrors that includes a first mirror having a first reflective surface and a second mirror having a second reflective surface. The pair of mirrors is arranged such that the first reflective surface and the second reflective surface face each other. The pair of mirrors is arranged one by one between the tip of the nozzle and a bottom surface of (Continued)

the arm, on both sides across a plane that includes a rotation axis of the arm and a central axis of the nozzle. The first mirror is disposed closer to the arm than the second mirror, with the first reflective surface facing toward the tip of the nozzle, and the second reflective surface facing toward the camera.

9 Claims, 7 Drawing Sheets

(51) Int. Cl.
    *G03B 17/17*      (2021.01)
    *H04N 23/53*      (2023.01)

(56) References Cited

U.S. PATENT DOCUMENTS

| | | | |
|---|---|---|---|
| 2018/0275053 A1* | 9/2018 | Obara | G01N 1/38 |
| 2018/0313773 A1* | 11/2018 | Broga | B01L 3/52 |
| 2019/0339189 A1* | 11/2019 | Takeda | G01N 37/00 |

FOREIGN PATENT DOCUMENTS

| | | |
|---|---|---|
| JP | 2012-032310 A | 2/2012 |
| JP | 2015-172509 A | 10/2015 |
| JP | 2017-151002 A | 8/2017 |

OTHER PUBLICATIONS

Extended European Search Report issued in corresponding EP Patent Application No. 22822848.2, dated Apr. 14, 2025 (9 pages).

* cited by examiner

L← →R

L← →R

IMAGING DEVICE

TECHNICAL FIELD

The present disclosure relates to an imaging device.

BACKGROUND ART

A nozzle used for pipetting a specimen or a reagent in an automatic analyzer is periodically replaced from the viewpoint of maintaining the pipetting accuracy. At the time of pipetting, it is necessary to insert the tip of the nozzle into a plurality of narrow spaces, such as a specimen container, a reagent container, or a cleaning hole. Therefore, each time the nozzle is replaced, the position of the tip of the nozzle needs to be adjusted with respect to the target stop position, such as the specimen container, the reagent container, or the cleaning hole.

In PTL 1, the problem is to be solved is to "provide a specimen processing device capable of adjusting the position of a moving part more easily and precisely than conventional devices, regardless of the complexity of the moving path of the moving part". In PTL 1, the following technique is disclosed: "When an abnormality occurs in a specimen analyzer, a camera 23d provided in the specimen analyzer captures an image of an object (cuvette) used for adjusting a mechanism (reagent pipetting unit 23) where the abnormality has occurred. The adjustment amount for the reagent pipetting unit 23 is detected based on the image obtained by imaging, and the reagent pipetting unit 23 is adjusted by the detected adjustment amount." (cf. Abstract of PTL 1).

In PTL 2, the problem to be solved is to "obtain a nozzle tip position measuring device in which damage to a nozzle tip or contamination of foreign matter does not occur, and which can accurately measure precise position information in the micrometer order". In PTL 2, the following technique is disclosed: "The device measures the tip position of a nozzle, which is provided on a moving means capable of relative movement in the XYZ triaxial directions, each orthogonal to the XY plane, on a base. The tip of the nozzle is equipped with a reference area imaging means that captures an image in a reference area determined beforehand on the base. A position displacement from the reference position of the tip of the nozzle, determined beforehand in the reference area, is measured using an image captured when the tip of the nozzle is moved to the reference position." (cf. Abstract of PTL 2).

CITATION LIST

Patent Literature

PTL 1: JP 2012-32310
PTL 2: JP 2005-49197

SUMMARY OF INVENTION

Technical Problem

In the technique described in PTL 1, an image of the tip of a pipette is captured at a target stop position, and detected is a deviation in the left-right direction between the center line of the acquired image and the target stop position as the adjustment amount. However, it is impossible to detect the deviation amount in the depth direction of the image. Thus, even when both the tip of the pipette and the target stop position coincide with the central axis of the image on the image, the tip of the nozzle may be adjusted to a position that deviates in the depth direction from the target stop position.

In the technique described in PTL 2, the reference position for adjusting the tip position of the nozzle is not the target stop position itself. Accordingly, when there is a deviation on the side of the target stop position, such as the specimen container, the reagent container, or the cleaning hole, it may not be possible to adjust the tip of the nozzle to the target stop position.

Therefore, the present disclosure provides a technique capable of detecting deviation amounts in two different directions between the tip of a nozzle of a pipetting device and a target stop position from one captured image.

Solution to Problem

In order to solve the above problem, an imaging device according to the present disclosure is an imaging device installed in a pipetting device including a nozzle configured to aspirate and dispense liquid and an arm configured to hold the nozzle and to move the nozzle by a rotation operation. The imaging device includes: a camera that includes an image sensor and a lens; and a pair of mirrors that includes a first mirror having a first reflective surface and a second mirror having a second reflective surface. The pair of mirrors is arranged such that the first reflective surface and the second reflective surface face each other. The pair of mirrors is arranged one by one between a tip of the nozzle and a bottom surface of the arm, on both sides across a plane that includes a rotation axis of the arm and a central axis of the nozzle. The first mirror is disposed closer to the arm than the second mirror, with the first reflective surface facing toward the tip of the nozzle, and the second reflective surface facing toward the camera.

Further features related to the present disclosure will become apparent from the description of the present specification and the accompanying drawings. The aspects of the present disclosure are achieved and realized by elements, combinations of various elements, the following detailed description, and aspects of the appended claims. The description of the present specification is merely exemplary, and does not limit the scope of claims or application examples of the present disclosure in any sense.

Advantageous Effects of Invention

According to the technology of the present disclosure, it is possible to detect deviation amounts in two different directions between the tip of the nozzle of the pipetting device and the target stop position from one captured image. Problems, configurations, and effects other than those described above will be clarified by the following description of embodiments.

DESCRIPTION OF EMBODIMENTS

First Embodiment

<Configuration Example of Automatic Analyzer>

Figure 1:
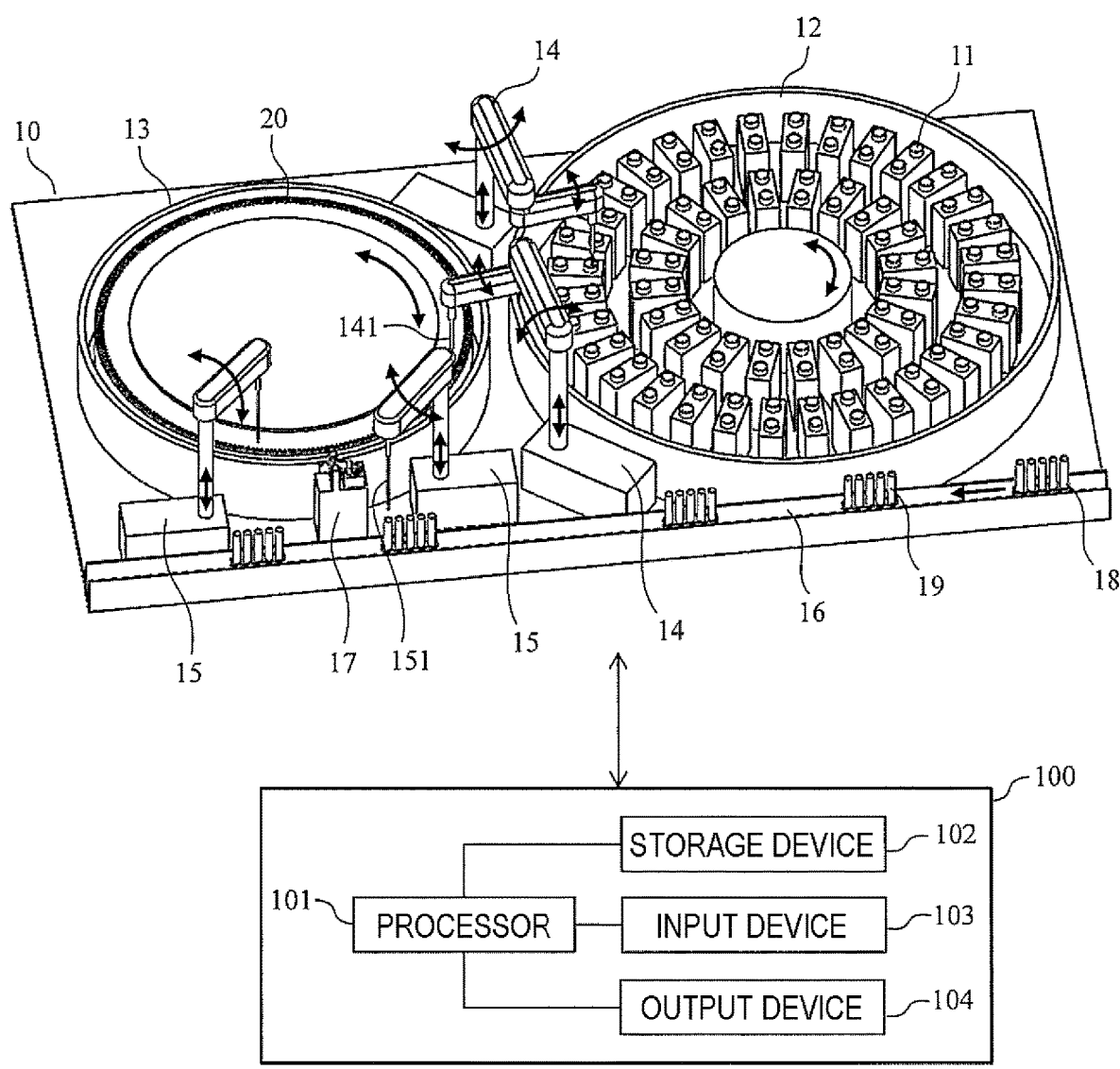
FIG. 1 is a schematic configuration diagram of an automatic analyzer.

FIG. 1 is a schematic configuration diagram of an automatic analyzer 10. The automatic analyzer 10 includes a reagent disk 12, a reaction disk 13, a plurality of reagent pipetting devices 14, a plurality of specimen pipetting devices 15, a conveyance line 16, a cleaning tank 17, and a control device 100.

The reagent disk 12 holds a plurality of reagent containers 11. The reaction disk 13 is configured to be rotatable and holds a plurality of reaction cells 20 arranged in the circumferential direction. The conveyance line 16 conveys a rack 18. The rack 18 holds a plurality of specimen containers 19. The reagent pipetting device 14 includes a nozzle 141 for pipetting a reagent (liquid) contained in the reagent container 11. The reagent pipetting device 14 is configured to be capable of moving the nozzle 141 in the horizontal direction and the vertical direction. The reagent pipetting device 14 aspirates the reagent into the nozzle 141 and dispenses the reagent to the reaction cell 20. The specimen pipetting device 15 includes the nozzle 151 for pipetting a specimen (liquid) contained in the specimen container 19. The specimen pipetting device 15 is configured to be capable of moving the nozzle 151 in the horizontal direction and the vertical direction. The specimen pipetting device 15 aspirates the specimen into the nozzle 151 and dispenses the specimen to the reaction cell 20. The specimen is, for example, a biological sample derived from blood, such as serum or whole blood, or derived from urine. The reagent and the specimen pipetted into the reaction cell 20 are stirred by a stirring device (not illustrated) to obtain a reaction liquid. The cleaning tank 17 cleans the nozzle 151 of the specimen pipetting device 15.

The reagent pipetting device 14 moves the nozzle 141 to a stop position for aspirating the reagent from the reagent container 11, a stop position for discharging the reagent into the reaction cell 20, and a stop position for washing off the reagent attached to the nozzle 141 in a cleaning tank (not illustrated). Similarly, the specimen pipetting device 15 moves the nozzle 151 to a stop position for aspirating the specimen from the specimen container 19, a stop position for discharging the specimen to the reaction cell 20, and a stop position for washing off the specimen attached to the tip of the nozzle 151 in the cleaning tank 17. The reagent pipetting device 14 moves up and down the nozzle 141 in accordance with the height of each stop position. The specimen pipetting device 15 moves up and down the nozzle 151 in accordance with the height of each stop position.

The control device 100 can be formed of a computer device. The control device 100 includes a processor 101, a storage device 102, an input device 103, and an output device 104. The processor 101 controls the operation of the automatic analyzer 10 according to a program stored in the storage device 102. The processor 101 analyzes the reaction liquid in the reaction cell 20. The storage device 102 can be formed of, for example, an internal memory or an external storage, and stores programs and parameters necessary for processing of the processor 101. The input device 103 can be formed of, for example, a mouse, a keyboard, a touch panel, or the like. The output device 104 can be formed of, for example, a display, a speaker, a touch panel, or the like.

<Configuration Example of Pipetting Device>

Figure 2:
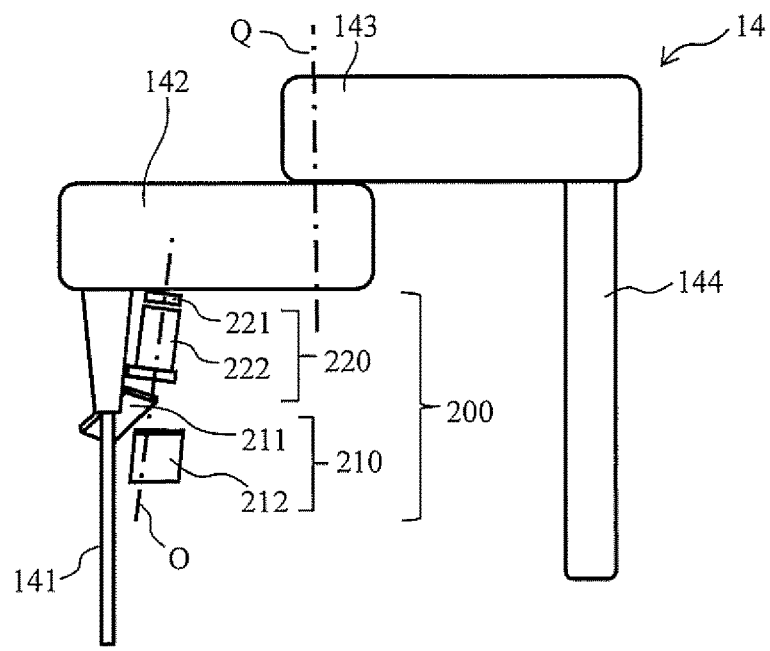
FIG.2 is a side view of a pipetting device with an imaging device attached thereto.

FIG. 2 is a side view of the reagent pipetting device 14 with an imaging device 200 attached thereto. The reagent pipetting device 14 includes the nozzle 141, arms 142, 143, and a shaft 144. The base end portion of the nozzle 141 is held by one end portion of the arm 142. The arm 142 is rotatably coupled to the arm 143. FIG. 2 illustrates a state where the arm 142 and the arm 143 are arranged in a straight line. The arm 143 is supported by the shaft 144. The shaft 144 is configured to be rotatable and vertically movable by a motor (not illustrated). Note that the arm 143 may not be provided, and in this case, the arm 142 is connected to the shaft 144.

As illustrated in FIG. 2, in the present specification, the longitudinal direction of the shaft 144 is defined as the vertical direction. A direction parallel to the longitudinal direction of the arm 142 is defined as the front-back direction, with the front denoted by F and the back denoted by B. An optical axis of a camera 220, that is, a straight line passing through the center of an image sensor 221 and the principal point of a lens 222, is denoted by O.

The imaging device 200 includes a pair of mirrors 210 and the camera 220. The pair of mirrors 210 includes a first mirror 211 and a second mirror 212 arranged such that the reflective surfaces face each other. That the reflective surfaces "face each other" does not mean that the reflective surface of the first mirror 211 and the reflective surface of the second mirror 212 face each other in parallel, but means that light reflected from the reflective surface of the first mirror 211 is incident on the reflective surface of the second mirror 212. The camera 220 is a monocular camera including an image sensor 221 and a lens 222. The imaging device 200 is attached to the arm 142 by an attachment member (not illustrated). The camera 220 is disposed below the bottom surface of the arm 142 and behind the nozzle 141. The first mirror 211 and the second mirror 212 are disposed between the tip of the nozzle 141 and the bottom surface of the arm 142. The attachment member includes support members that support each of the first mirror 211 and the second mirror 212, respectively.

Figure 3:
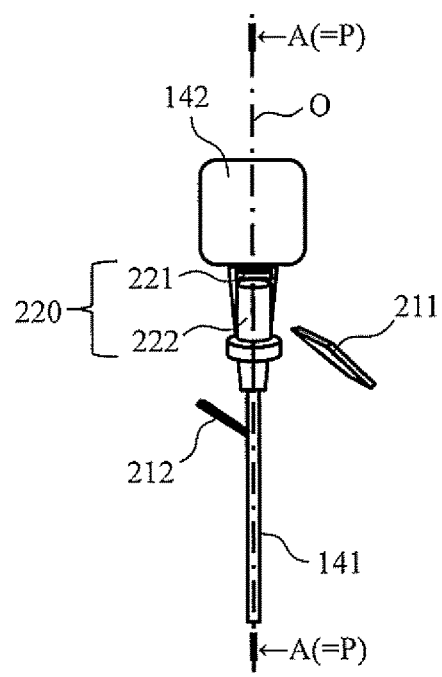
FIG. 3 is a rear view of the periphery of the imaging device of the pipetting device with the imaging device attached thereto.

FIG. 3 is a rear view of the periphery of the imaging device 200 as viewed from the back. As illustrated in FIG. 3, in the present specification, the lateral direction (a direction perpendicular to the vertical direction and the front-back direction) of the arm 142 is defined as the left-right direction, with the right denoted by R and the left denoted by L. A plane including a rotation axis Q of the arm 142 and the central axis of the nozzle 141 is denoted by A. A plane including the center of the image sensor 221 and the central axis of the nozzle 141 is denoted by P. In the present embodiment, the plane A and the plane P are the same.

The first mirror 211 is disposed on a right R of the plane A. The second mirror 212 is disposed on a left L of the plane A. That is, the first mirror 211 and the second mirror 212 are disposed one by one on both sides, the left L and the right R, across the plane A. The reflective surface of the first mirror 211 faces toward the tip of the nozzle 141. The reflective surface of the second mirror 212 faces toward the base end portion of the nozzle 141. The first mirror 211 is disposed closer to the base end portion of the nozzle 141 than the second mirror is, that is, disposed above the second mirror 212.

Since the pair of mirrors 210 is arranged as described above, the images of the tip portion of the nozzle 141 viewed from viewpoints in two different directions are formed on the image sensor 221, which will be described later in detail. The image sensor 221 outputs the captured images to the control device 100. The control device 100 processes the images captured by the image sensor 221 and calculates deviation amounts in two directions between the tip of the nozzle 141 and the target stop position. The control device 100 calculates the adjustment amount of the position of the nozzle 141 based on the calculated deviation amounts, and adjusts the operation amount of the motor of the reagent pipetting device 14 based on the adjustment amount.

<Captured Image>

Figure 4A:
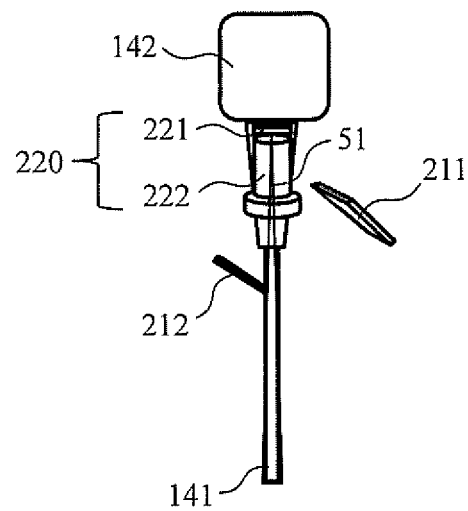
FIG. 4A is a diagram for explaining an optical path of object light incident on the image sensor.
Figure 4B:
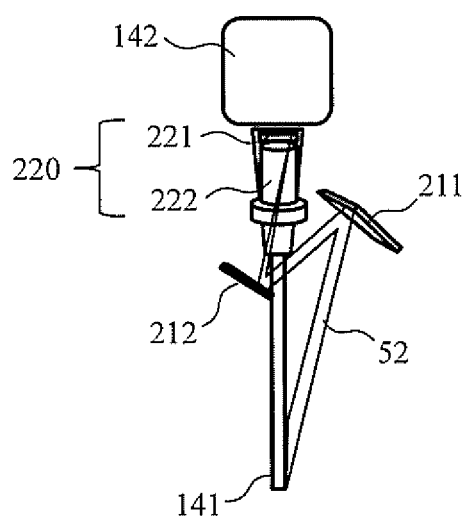
FIG. 4B is a diagram for explaining an optical path of object light incident on the image sensor.

FIGS. 4A and 4B are diagrams for explaining optical paths of object light incident on the image sensor 221. FIG. 4A illustrates an optical path 51 of the object light reflected by the front side surface of the tip portion of the nozzle 141. FIG. 4B illustrates an optical path 52 of the object light reflected by the right side surface of the tip portion of the nozzle 141. As indicated by the optical path 51 in FIG. 4A, the object light reflected by the front side surface of the tip portion of the nozzle 141 is directly incident on the lens 222 and forms an image in a first region substantially at the center of the image sensor 221. On the other hand, as indicated by the optical path 52 in FIG. 4B, the object light reflected by the right side surface of the tip portion of the nozzle 141 is once reflected by the first mirror 211 toward the tip of the nozzle 141, then reflected by the second mirror 212 toward the camera 220, and forms an image in a second region at the right end portion of the image sensor 221. Therefore, in the present embodiment, images of the tip portion of the nozzle 141 viewed from two different viewpoints are displayed on one image sensor 221.

An example of the stop position of the nozzle 141 is a cleaning hole disposed at the bottom of the cleaning tank 17. The nozzle 141 is inserted into the cleaning hole and then cleaned, thus requiring the adjustment of the position of the nozzle 141 to the center of the cleaning hole.

Figure 5:
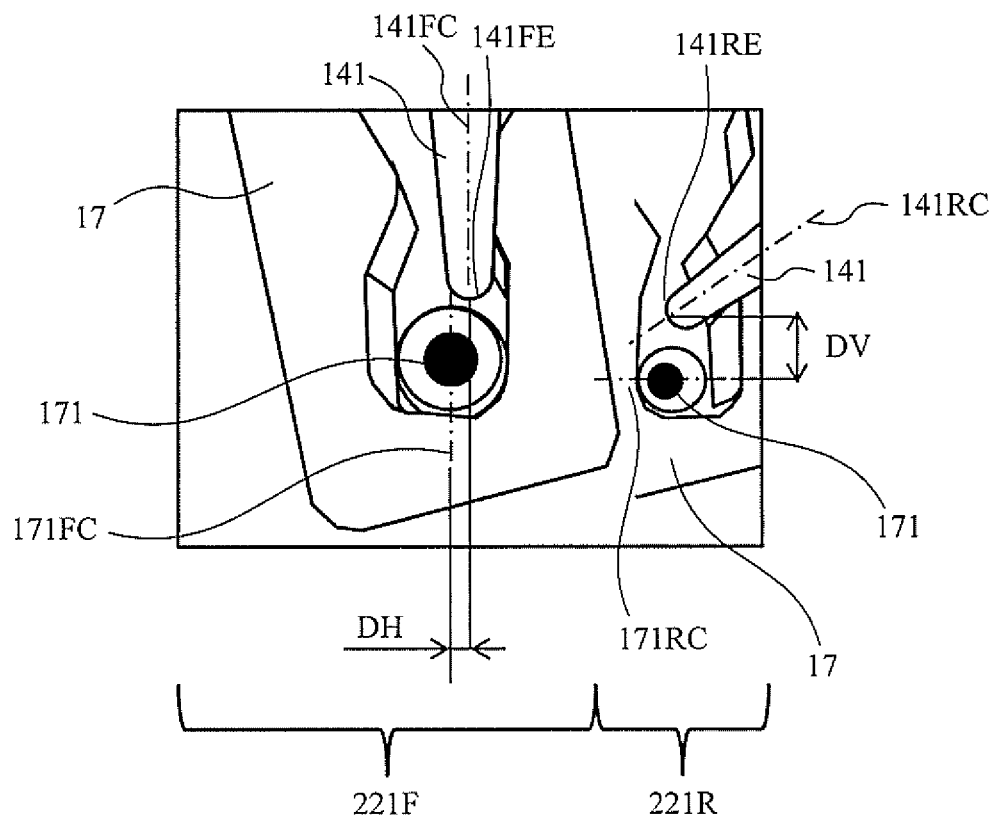
FIG. 5 is a schematic diagram illustrating an example of an image of a nozzle captured by the imaging device.

FIG. 5 is a schematic diagram illustrating an example of an image of the nozzle 141 stopped above a cleaning hole 171 of the cleaning tank 17 captured by the imaging device 200. As illustrated in FIG. 5, in one image, an image 221F is captured in a first imaging region and an image 221R is captured in a second imaging region. The image 221F is from a viewpoint placed on the front side surface of the tip portion of the nozzle 141. The image 221R is from a viewpoint placed on the right side surface of the tip portion of the nozzle 141. Therefore, it is possible to detect the deviation amount in the left-right direction between the center of the cleaning hole 171 (the target stop position) and the tip of the nozzle 141 from the image 221F as a distance DH between the intersection of a central axis 141FC of the nozzle 141 and a tip edge 141FE of the nozzle 141 and a center line 171FC in the left-right direction of the cleaning hole 171. Similarly, it is possible to detect the deviation amount in the front-back direction between the center of the cleaning hole 171 and the tip of the nozzle 141 from the image 221R as a distance DV between the intersection of a central axis 141RC of the nozzle 141 and a tip edge 141RE of the nozzle 141 and a center line 171RC in the vertical direction of the cleaning hole 171.

As described above, according to the imaging device 200 of the present embodiment, with the pair of mirrors 210 being arranged as described above, the images of the tip portion of the nozzle 141 viewed from two different viewpoints are displayed on one image sensor 221. Accordingly, it is possible to detect, from one captured image, in two directions of the left-right direction and the front-back direction between the tip position of the nozzle 141 and the target stop position. In this manner, a deviation in the left-right direction is detected from one of the two regions included in one captured image, and a deviation in the front-back direction is detected from the other region. Thereby, it is possible to reduce the number of pixels to be processed at a time compared to the case of processing all the regions in one captured image, resulting in an improvement in processing speed.

Note that the directions of the viewpoints, from which imaging is performed, are not limited to the left-right direction and the front-back direction, but may be two intersecting directions. In particular, imaging from viewpoints in two orthogonal direction enables precise detection of a deviation between the tip of the nozzle 141 and the target stop position. Note that the term "orthogonal" in the present specification includes not only a mode in which two directions intersect strictly at an angle of 90° but also a mode in which two directions intersect at an angle within a range of 90°±error (substantially orthogonal).

As described above, in the first embodiment, it has been described that the imaging device 200 is attached to the reagent pipetting device 14. The imaging device 200 can be similarly attached to the specimen pipetting device 15. In this case, the imaging device 200 can detect deviations in two directions from one captured image by capturing images of the position of the nozzle 151 of the specimen pipetting device 15.

It has been described that the imaging device 200 is attached to the pipetting device of the automatic analyzer 10 has been described. The imaging device 200 is also applicable to pipetting devices mounted on other devices.

<Modification of First Embodiment>

The imaging device 200 may be configured to be detachable from the pipetting device. The imaging device 200 may be attached to the pipetting device only during the position adjustment for the nozzle and detached during normal analysis operation. In this case, there is no mass of the imaging device 200 during the analysis operation, thereby the load on the motor that drives the pipetting device can be reduced. As a result, the throughput of the analysis can be improved.

The second mirror 212 may be disposed closer to the optical axis O of the camera 220 than the first mirror 211. In this case, on the captured image, the area of the second imaging region, where an image is captured via the first mirror 211 and the second mirror 212, increases. This is advantageous for recognition of the positional relationship in the front-back direction between the tip of the nozzle 141 and the target stop position. In this case, the position of the nozzle 141 on the captured image is the same as the position illustrated in FIG. 5.

When a single focal length lens is used for the lens 222, the second mirror 212, which is disposed on the tip side of the nozzle 141, can be made smaller than the first mirror 211. This is because the second mirror 212 is disposed at a position closer to the camera 220 than the first mirror 211 on the optical path 52 where object light from the right side surface of the tip portion of the nozzle 141 reaches the second imaging region via the first mirror 211 and the second mirror 212. This enables the nozzle 141 to move between the plurality of target stop positions without a collision of the imaging device 200 with other components in the automatic analyzer 10.

Glass (refractive index>1) having a longitudinal direction in the optical axis direction of the camera 220 may be disposed on the optical path 51 and outside the optical path 52. In this case, the focus of the camera 220 is set at a position separated from the image sensor 221 by the optical path length of the optical path 52. This can equalize the optical path length of the image 221F and the optical path length of the image 221R, thus improving image resolution.

<Summary of First Embodiment>

As described above, the imaging device 200 according to the first embodiment is installed in the reagent pipetting device 14 including the nozzle 141 that aspirates and dispenses liquid and the arm 142 that holds the nozzle 141 and moves the nozzle 141 by a rotational operation. The imaging device 200 includes the camera 220 including the image sensor 221 and the lens 222, and the pair of mirrors 210 including the first mirror 211 and the second mirror 212. The pair of mirrors 210 is arranged such that the reflective surface of the first mirror 211 faces the reflective surface of the second mirror 212. The pair of mirrors 210 is arranged one by one between the tip of the nozzle 141 and the bottom surface of the arm 142, on both sides across the plane A that includes the rotation axis Q of the arm 142 and the central axis of the nozzle 141. The first mirror 211 is disposed closer to the arm 142 than the second mirror 212. The reflective surface of the first mirror 211 faces toward the tip of the nozzle 141. The reflective surface of the second mirror 212 faces toward the camera 220.

According to these configurations, an image of the tip portion of the nozzle 141 viewed from a first viewpoint is formed in a first imaging region of the image sensor 221. An image of the tip portion of the nozzle 141 viewed from a second viewpoint is formed in a second imaging region of the image sensor 221. Therefore, one captured image includes images of the nozzle 141 viewed from two different viewpoints. Accordingly, it is possible to detect deviation amounts in two different directions between the tip of the nozzle 141 of the reagent pipetting device 14 and the target stop position.

Second Embodiment

In the second embodiment, another example of the positional relationship between the camera 220 and the pair of mirrors 210 will be described. In the drawings, elements having the same functions as those of the first embodiment are denoted by the same reference numerals, and the description thereof will be omitted.

Figure 6:
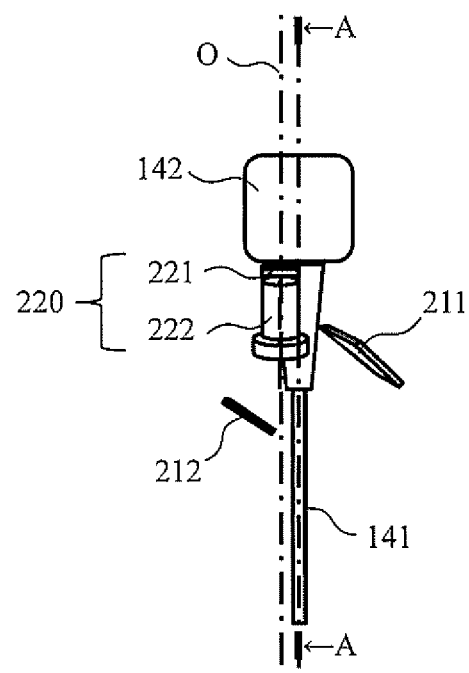
FIG. 6 is a rear view of the periphery of the imaging device of the pipetting device with the imaging device attached thereto.

FIG. 6 is a rear view of the periphery of the imaging device 200 according to a second embodiment as viewed from the back. In the first embodiment described above, it has been described that the optical axis O of the camera 220 and the central axis of the nozzle 141 are arranged on the same plane A. In contrast, in the present embodiment, as illustrated in FIG. 6, the camera 220 is disposed to be translated to the left L side such that the optical axis 0 of the camera 220 is located on the left L side with respect to the plane A defined in the first embodiment.

Figure 7:
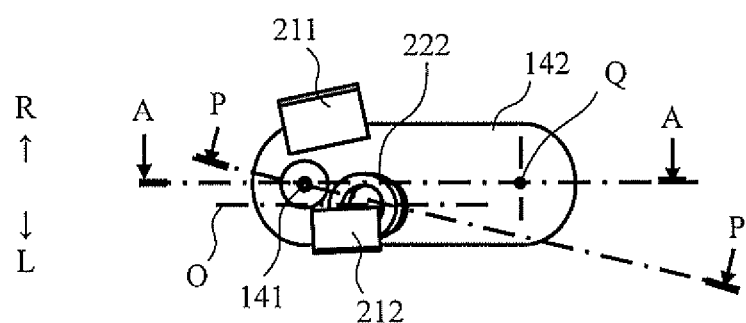
FIG. 7 is a bottom view of the periphery of the imaging device of the pipetting device with the imaging device attached thereto.

FIG. 7 is a bottom view of the periphery of the imaging device 200 of the reagent pipetting device 14 according to the second embodiment. As illustrated in FIG. 7, the optical axis O of the camera 220 is disposed outside the plane P including the center of the image sensor 221 and the central axis of the nozzle.

Figure 8A:
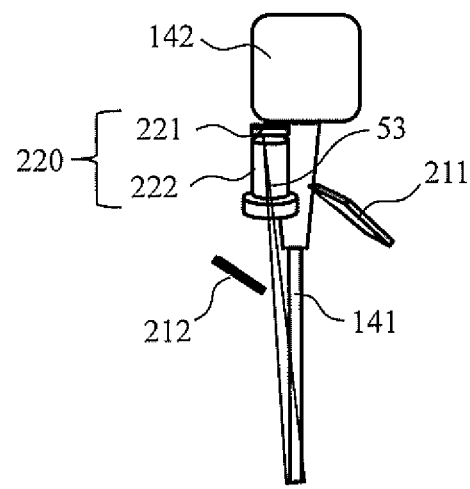
FIG. 8A is a diagram for explaining an optical path of object light incident on the image sensor.
Figure 8B:
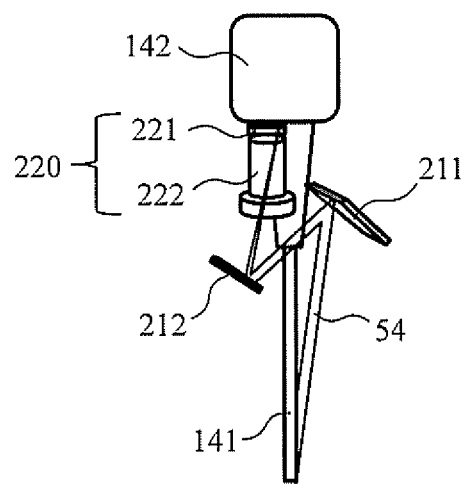
FIG. 8B is a diagram for explaining an optical path of object light incident on the image sensor.

FIGS. 8A and 8B are diagrams for explaining optical paths of object light incident on the image sensor 221. FIG. 8A illustrates an optical path 53 of the object light reflected by the front surface of the tip portion of the nozzle 141. FIG. 8B illustrates an optical path 54 of the object light reflected by the right side surface of the tip portion of the nozzle 141. As illustrated by the optical path 53 in FIG. 8A, the object light reflected by the front side surface of the tip portion of the nozzle 141 is directly incident on the lens 222 and forms an image in a first region on the left half of the image sensor 221. On the other hand, as illustrated by the optical path 54 in FIG. 8B, the object light reflected by the right side surface of the tip portion of the nozzle 141 is once reflected by the first mirror 211 toward the tip of the nozzle 141, then reflected by the second mirror 212 toward the camera 220, and forms an image in a second region on the right half of the image sensor 221. Therefore, in the present embodiment, images of the tip portion of the nozzle 141 from different viewpoints are projected with substantially the same area on one image sensor 221.

Figure 9:
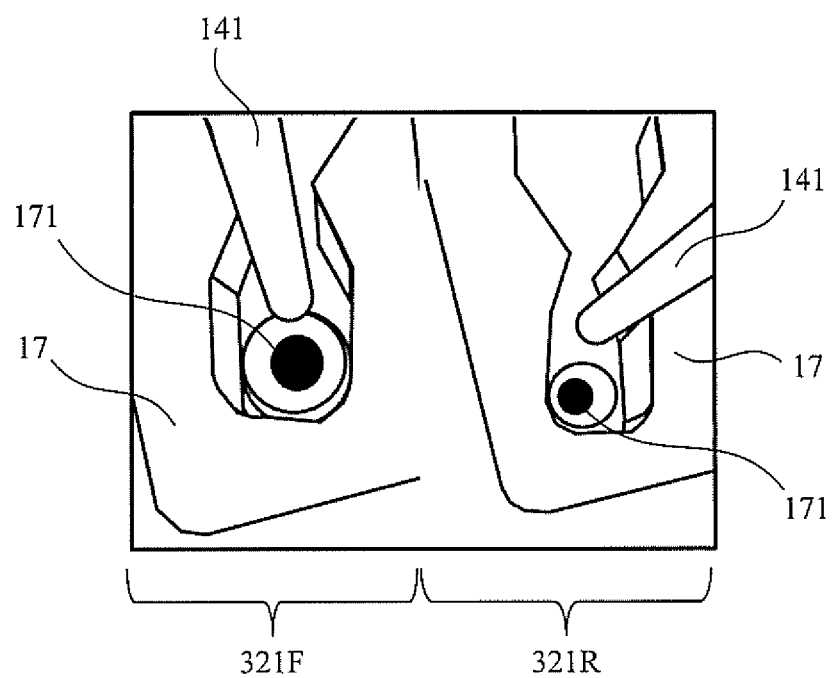
FIG. 9 is a schematic diagram illustrating an example of an image of a nozzle captured by the imaging device.

FIG. 9 is a schematic diagram illustrating an example of an image of the nozzle 141 stopped above the cleaning hole 171 of the cleaning tank 17 captured by the imaging device 200. As illustrated in FIG. 9, in the present embodiment, an area of an image 321F in the first imaging region and an area of an image 321R in the second imaging region are substantially equal. The tip portion of the nozzle 141 can be projected near the center of each of the first imaging region and the second imaging region. Therefore, there is no unnecessary region on the captured image. It is possible to more accurately detect deviation amounts in two directions of the left-right direction and the front-back direction between the tip of the nozzle 141 and the target stop position. In this manner, according to the imaging device 200 of the present embodiment, it is possible to more efficiently detect deviations in two directions of the left-right direction and the front-back direction between the tip position of the nozzle 141 and the target stop position from one captured image.

<Summary of Second Embodiment>

As described above, in the imaging device 200 according to the second embodiment, the optical axis O of the camera 220 is disposed outside the plane A including the rotation axis Q of the arm 142 and the central axis of the nozzle. As a result, the area of the image 321F in the first imaging region of the image sensor 221 and the area of the image 321R in the second imaging region can be made substantially equal. Consequently, it is possible to detect more accurately deviation amounts of the tip of the nozzle 141 in two directions.

Modification

The present disclosure is not limited to the above embodiments, and includes various modifications. For example, the above embodiments have been described in detail to describe the present disclosure in an easy-to-understand manner, and do not necessarily have all the configurations described. It is possible to replace a part of one embodiment with components of another embodiment. It is also possible to add components of another embodiment to the components of one embodiment. Furthermore, it is possible to perform addition, deletion, or replacement for some of the components of each embodiment, using some of the components of another embodiment.

REFERENCE SIGNS LIST 10 automatic analyzer
11 reagent container
12 reagent disk
13 reaction disk
14 reagent pipetting device
15 specimen pipetting device
16 conveyance line
17 cleaning tank
18 rack
19 specimen container
20 reaction cell
51 to 54 optical path
141 nozzle
142, 143 arm
144 shaft
151 nozzle
171 cleaning hole
200 imaging device
211 first mirror
212 second mirror
220 camera
221 image sensor
222 lens

The invention claimed is:

1. An imaging device installed in a pipetting device including a nozzle configured to aspirate and dispense liquid and an arm configured to hold the nozzle and to move the nozzle by a rotation operation, the imaging device comprising:
a camera that includes an image sensor and a lens; and
a pair of mirrors that includes a first mirror having a first reflective surface and a second mirror having a second reflective surface,
wherein the pair of mirrors is arranged such that the first reflective surface and the second reflective surface face each other, and the pair of mirrors is arranged one by one between a tip of the nozzle and a bottom surface of the arm, on both sides across a plane that includes a rotation axis of the arm and a central axis of the nozzle, and
the first mirror is disposed closer to the arm than the second mirror, with the first reflective surface facing toward the tip of the nozzle, and the second reflective surface facing toward the camera.

2. The imaging device according to claim 1, wherein the second mirror is disposed at a position closer to the plane than the first mirror.

3. The imaging device according to claim 2, wherein the second mirror is smaller than the first mirror.

4. The imaging device according to claim 1, wherein the imaging device is configured to be detachable from the pipetting device.

5. The imaging device according to claim 2, wherein an optical axis of the camera is disposed out of the plane including the rotation axis of the arm and the central axis of the nozzle.

6. The imaging device according to claim 1, wherein the imaging device is attached to the arm such that the camera is located near a base end portion of the nozzle.

7. The imaging device according to claim 1, wherein
the lens is disposed such that light from a tip portion of the nozzle viewed from a first viewpoint is directly incident, and
the pair of mirrors is arranged such that light from the tip portion of the nozzle at a second viewpoint different from the first viewpoint is reflected by the first mirror, then reflected by the second mirror, and incident on the lens.

8. The imaging device according to claim 7, wherein a direction of the first viewpoint is orthogonal to a direction of the second viewpoint.

9. The imaging device according to claim 7, further comprising a control device configured to process an image captured by the image sensor,
wherein the control device is configured to calculate a deviation amount between the nozzle and a target stop position of the nozzle, which are projected in a region corresponding to the first viewpoint in the image, and
the control device is configured to calculate a deviation amount between the nozzle and the target stop position, which are projected in a region corresponding to the second viewpoint in the image.

* * * * *